(12) United States Patent
Akamine et al.

(10) Patent No.: US 10,847,151 B2
(45) Date of Patent: Nov. 24, 2020

(54) DIALOGUE SYSTEM AND DIALOGUE METHOD

(71) Applicant: KABUSHIKI KAISHA TOSHIBA, Minato-ku (JP)

(72) Inventors: Masami Akamine, Yokosuka (JP); Takami Yoshida, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 126 days.

(21) Appl. No.: 15/899,885

(22) Filed: Feb. 20, 2018

(65) Prior Publication Data
US 2019/0139537 A1 May 9, 2019

(30) Foreign Application Priority Data
Nov. 8, 2017 (JP) ................................. 2017-215433

(51) Int. Cl.
| | |
|---|---|
| *G10L 15/22* | (2006.01) |
| *G10L 15/18* | (2013.01) |
| *G10L 15/06* | (2013.01) |
| *G06F 40/35* | (2020.01) |
| *G06F 40/56* | (2020.01) |
| *G06F 40/216* | (2020.01) |
| *G10L 25/63* | (2013.01) |

(52) U.S. Cl.
CPC ............ *G10L 15/22* (2013.01); *G06F 40/216* (2020.01); *G06F 40/35* (2020.01); *G06F 40/56* (2020.01); *G10L 15/063* (2013.01); *G10L 15/1815* (2013.01); *G10L 25/63* (2013.01); *G10L 2015/223* (2013.01)

(58) Field of Classification Search
CPC ................................ G10L 15/22; G10L 25/63
See application file for complete search history.

(56) References Cited

U.S. PATENT DOCUMENTS

| | | | |
|---|---|---|---|
| 2002/0013860 A1 | 1/2002 | Inoue et al. | |
| 2006/0215824 A1* | 9/2006 | Mitby | G10L 15/22 379/100.05 |
| 2010/0332287 A1* | 12/2010 | Gates | G06F 17/277 705/7.32 |
| 2011/0282913 A1 | 11/2011 | Kitamura et al. | |
| 2016/0103833 A1* | 4/2016 | Sanders | G10L 15/22 707/723 |

(Continued)

FOREIGN PATENT DOCUMENTS

| | | |
|---|---|---|
| JP | 2002-099404 | 4/2002 |
| JP | 2007-286377 A | 11/2007 |

(Continued)

OTHER PUBLICATIONS

Su, Pei-Hao, et al. "Learning from real users: Rating dialogue success with neural networks for reinforcement learning in spoken dialogue systems." arXiv preprint arXiv:1508.03386 (2015). (Year: 2015).*

(Continued)

*Primary Examiner* — Douglas Godbold
(74) *Attorney, Agent, or Firm* — Oblon, McClelland, Maier & Neustadt, L.L.P.

(57) ABSTRACT

According to an embodiment, a dialogue system includes a satisfaction estimator, a dialogue state estimator, and a behavior determiner. The satisfaction estimator estimates a satisfaction of a user based on a speech input from the user. The dialogue state estimator estimates a dialogue state with the user based on the speech input from the user and the estimated satisfaction of the user. The behavior determiner determines a behavior towards the user based on the estimated dialogue state.

9 Claims, 8 Drawing Sheets

(56) References Cited

U.S. PATENT DOCUMENTS

| | | | |
|---|---|---|---|
| 2017/0228366 A1* | 8/2017 | Bui | G06F 17/279 |
| 2018/0226076 A1* | 8/2018 | Kotti | G10L 15/22 |
| 2018/0307672 A1* | 10/2018 | Akkiraju | G06F 17/279 |
| 2018/0329998 A1* | 11/2018 | Thomson | G06F 16/9535 |
| 2019/0115027 A1* | 4/2019 | Shah | G10L 15/30 |

FOREIGN PATENT DOCUMENTS

| | | |
|---|---|---|
| JP | 4890585 | 3/2012 |
| JP | 2017-162385 A | 9/2017 |
| JP | 62-24857 B1 | 10/2017 |

OTHER PUBLICATIONS

Jason D. Williams, "Applying POMDPs to Dialog Systems in the Troubleshooting Domain," In Workshop on Bridging the GAP: Academic and Industrial Research in Dialog Technology, 2007, pp. 1-8.

Bing Liu, et al., "Attention-Based Recurrent Neural Network Models for Joint Intent Detection and Slot Filling," INTERSPEECH 2016, pp. 685-689.

Inuzuka et al.—Therapeutic Robot PDD1N2007 "Implementation of Functions to Utter Emotional Voices and to Learn Behavior Planning, and Upgrade of Emotion Generation Process" (with English translation), The Institute of Electronics Information and Communication Engineers, IEICE Technical Report TL2007-49 (Dec. 7, 2007), vol. 107. No. 387.

Engelbrecht et al.—"Modeling User Satisfaction with Hidden Markov Models", Proceedings of Sigdial 2009: the 10th Annual Meeting of the Special Interest Group in Discourse and Dialogue, pp. 170-177, Queen Mary University of London Sep. 2009.

* cited by examiner

| Dialogue ended? | Satisfaction rating | Reward values |
|---|---|---|
| No | 1 | −5 |
| | 2 | −3 |
| | 3 | −1 |
| | 4 | 1 |
| | 5 | 2 |
| Yes | - | 20 |

DIALOGUE SYSTEM AND DIALOGUE METHOD

CROSS-REFERENCE TO RELATED APPLICATIONS

This application is based upon and claims the benefit of priority from prior Japanese Patent Application No. 2017-215433, filed Nov. 8, 2017, the entire contents of which are incorporated herein by reference.

FIELD

Embodiments described herein relate generally to dialogue control between a user and a dialogue system.

BACKGROUND

In recent times, the actions (behaviors) which can be adopted by systems holding dialogue with users of, for example, smartphone applications, PC applications or automated response systems in call centers are becoming ever more sophisticated.

These dialogue systems can specifically respond promptly to a user inquiry, search or narrow down the prospects for a product, service or shop name that satisfies the user's request criteria, and provide the results thereof to the user. There are various uses for a system handling these dialogues (herein also referred as search dialogues), for example, store and restaurant guidance for shopping centers and hotel and travel destination guidance on internet travel sites.

So far, rule-based dialogue controls and statistical approach-based dialogue controls have been used to realize the search dialogues. Under a rule-based dialogue control, the developer needs to set rules by plotting dialogue scenarios between the user and the dialogue system and then manually and comprehensively plot beforehand responses by the system to the inputs from the user for each scenario. To set these rules has been time- and effort-consuming for developers, giving rise to the problem of increased developing costs and longer development times. With a statistical approach-based dialogue control, on the other hand, the disadvantages of the rule-based dialogue control are surmountable, since dialogue control is made viable by utilizing both a dialogue-state model estimating the user's request criteria from the user's input and a policy model for determining the dialogue system's behavior towards the user. Dialogue-state models and policy models can be generated by machine learning based on dialogue example data.

One statistical approach-based dialogue control that is specifically proposed is based on the model of a Partially Observable Markov Decision Process (POMDP) (hereinafter referred to as "POMDP dialogue control system"). Unlike a rule-based dialogue control system, a POMDP dialogue control system does not require the developer to set the rules, which is advantageous in terms of cutting development cost and time.

However, both conventional dialogue systems, namely the rule-based dialogue control system and the statistical approach-based dialogue control system including a POMDP dialogue control system convert the user's speech input into text and then determine the dialogue system's behavior towards the text-converted user input. The user's speech input reflects non-verbal information such as the speech tone and emotion. Since the non-verbal information is lost in the speech recognition process, it has never been given consideration within the determination of the behavior by the dialogue system.

When determining a behavior of the dialogue system without giving consideration to the non-verbal information such as the speech tone or emotion inherent in the user's speech input, the satisfaction of the user will presumably be impaired. If, for example, a user uses the dialogue system to perform a restaurant search from within a moving train, the user's speech input may end up falsely recognized due to the surrounding noise, resulting in the dialogue system presenting restaurants which deviate from the user's request. Similarly, the user's speech input may not be recognized as such and the dialogue system may then have to repeat the inquiry for the genre that is preferred. Under such conditions, the user's speech input may show signs of impatience which the dialogue system fails to pick up on and hence repeatedly puts out annoying system responses that further cause the satisfaction of the user regarding the system to plummet.

DETAILED DESCRIPTION

According to an embodiment, a dialogue system includes a satisfaction estimator, a dialogue state estimator, and a behavior determiner. The satisfaction estimator estimates a satisfaction of a user based on a speech input from the user. The dialogue state estimator estimates a dialogue state with the user based on the speech input from the user and the estimated satisfaction of the user. The behavior determiner determines a behavior towards the user based on the estimated dialogue state.

According to another embodiment, a dialogue system includes a satisfaction estimator, a dialogue state estimator, and a behavior determiner. The satisfaction estimator estimates a satisfaction of a user based on a speech input from the user. The dialogue state estimator estimates a dialogue state with the user based on an input from the user. The behavior determiner determines a behavior towards the user based on the estimated satisfaction and the estimated dialogue state.

According to another embodiment, a dialogue system includes a satisfaction estimator, a dialogue state estimator, a behavior determiner, and a dialogue discontinuation determiner. The satisfaction estimator estimates a satisfaction of a user based on a speech input from the user. The dialogue state estimator estimates a dialogue state with the user based on at least an input from the user. The behavior determiner determines a behavior towards the user based on the estimated dialogue state. The dialogue discontinuation determiner determines whether or not to discontinue the dialogue with the user based on at least the estimated satisfaction.

Embodiments will be described with reference to the drawings. Elements coinciding with or similar to elements earlier described are tagged by the same or a corresponding reference symbol; redundancies will be omitted in general.

First Embodiment

Figure 1:
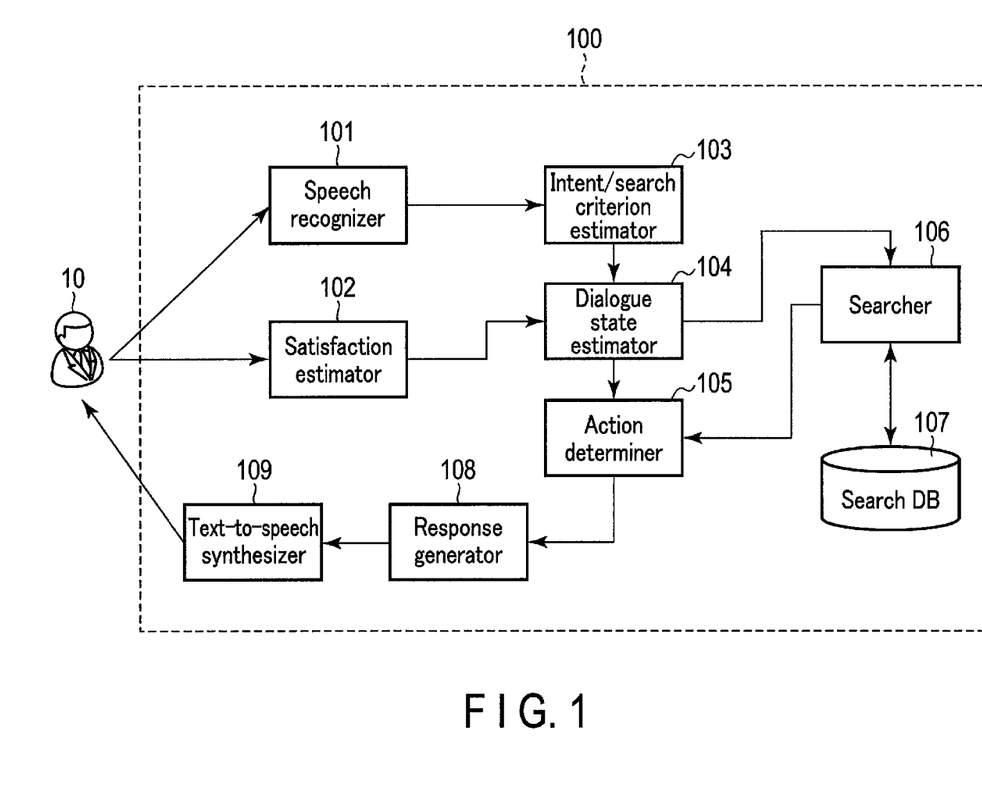
FIG. 1 is a block diagram showing a dialogue system according to a first embodiment.

A dialogue system 100 according to a first embodiment as shown in FIG. 1 comprises a speech recognizer 101, a satisfaction estimator 102, an intent/search criterion estimator 103, a dialogue state estimator 104, a behavior determiner 105, a searcher 106, a search database (DB) 107, a response generator 108, and a text-to-speech synthesizer 109.

The dialogue system 100 does not have to be put into practice by a single device such as a single smartphone or computer. In other words, the device realizing one functioning unit may be different from the device realizing the other functioning unit(s). It is possible, for example, that the speech recognizer 101 and the text-to-speech synthesizer 109 are viable by a smartphone belonging to the user 10, while the remaining functioning units are viable by one or more servers.

The speech recognizer 101 receives, for example from a microphone not shown in the drawings, a speech input from a user 10 as an electric signal. The speech recognizer 101 then performs Automated Speech Recognition (ASR) unto the speech input from the user 10 to obtain a recognized text. The speech recognizer 101 then transmits the recognized text to the intent/search criterion estimator 103.

The user inputs that are receivable by the intent/search criterion estimator 103 are not limited to text that has been recognized. Therefore, another input unit may be used either in addition to or in replacement of the speech recognizer 101. The input unit may specifically be configured to receive text from direct text input devices such as keyboards, or text from operation information such as touch information that has been entered into a Graphical User Interface (GUI) component.

The satisfaction estimator 102 receives, for example from a microphone not shown in the drawings, a speech input from the user 10 as an electric signal. The satisfaction estimator 102 then estimates a satisfaction of the user 10 based on the speech input from the user 10. The satisfaction estimator 102 then transmits the estimated satisfaction to the dialogue state estimator 104.

Figure 4:
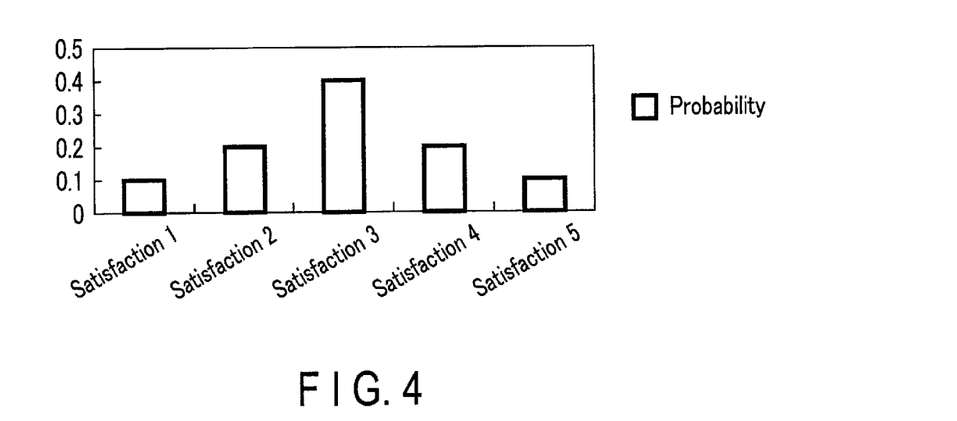
FIG. 4 is an illustration of the posterior probability distribution of the satisfaction estimated by the satisfaction estimator shown in FIG. 1.

The satisfaction may be estimated on a scale of 1 to 5, for example "1: totally unsatisfied", "2: unsatisfied", "3: average", "4: satisfied", and "5: totally satisfied". The satisfaction may be expressed by a single rating or by a probability distribution over multiple instances of rating as shown in FIG. 4. Note that the scale of 1 to 5 is merely an example; scales may range from 1 to 2 ("1: unsatisfied" and "2: satisfied"), from 1 to 3 ("1: unsatisfied", "2: average" and "3: satisfied") or within any other numerical range.

The satisfaction estimator 102 may, for example, estimate the satisfaction of the user 10 based on preset rules. Alternatively, the satisfaction estimator 102 may estimate satisfaction of the user 10 by feeding data based on speech input to a learnt statistical model (e.g. a learnt neural network). The learnt statistical model may be created by, for example, supervised learning which uses learn-specific speech input with a label indicative of the satisfaction. The details on the performances of the satisfaction estimator 102 and the machine learning will be explained further below.

The intent/search criterion estimator 103 receives the text recognized by the speech recognizer 101, and then estimates, based thereon, the intent and/or the search criterion of the user 10. The intent/search criterion estimator 103 then transmits the estimated intent/search criterion to the dialogue state estimator 104.

For each utterance by the user 10, the intent/search criterion estimator 103 estimates the intent/search criterion based on the recognized text corresponding to each of the utterances by the user 10. In other words, for each utterance made by the user 10, the intent/search criterion estimator 103 estimates the user's intent/search criterion readable from the recognized converted text.

The intent of the user 10 may, for example, be expressed as a set of (speech) tags and slots.

Speech tags are pieces of information estimated from recognized text (more generally input text) which loosely categorize the actions of the user 10 towards the dialogue system 100. Specifically speech tags can be used such as "transmitting request (Inform)", "confirming information (Confirm)", "affirming (Affirm)/negating (Negate) inquiry from dialogue system 100". It is also possible to define speech tags, where applicable, for more specific actions, e.g. "searching restaurant (Inform-search-restaurant)", "searching hotel (Inform-search-hotel)".

Slots, on the other hand, are pieces of information included in the text input (or estimated therefrom) which are needed for the dialogue process. Slots are expressed as [slot name=value]. As an example, the intent/search criterion estimator 103 may, from the text input "buy cheap bag", estimate slots such as [price=cheap] and [product=bag]. Slots and slot names may also be replaced with attributes and attribute names.

The intent/search criterion estimator 103 may estimate speech tags and slots using keyword matching, or may estimate speech tags and slots using statistical approaches such as a maximum entropy method, a neural network or any other statistical model. Useful statistical approaches are, for example, learnt statistical models created by machine learning using strings of words included in the learn-specific text input.

The estimation of speech tags and slots using a neural network is viable by techniques described in, for example, Related Art 1 (Bing Liu and Ian Lane, "Attention-Based Recurrent Neural Network Models for Joint Intent Detection and Slot Filling", Proceedings of INTERSPEECH 2016, pp. 685-689, 2016 ISCA). The document describes how a Recurrent Neural Network (RNN), that is a kind of neural network, was used.

Figure 2:
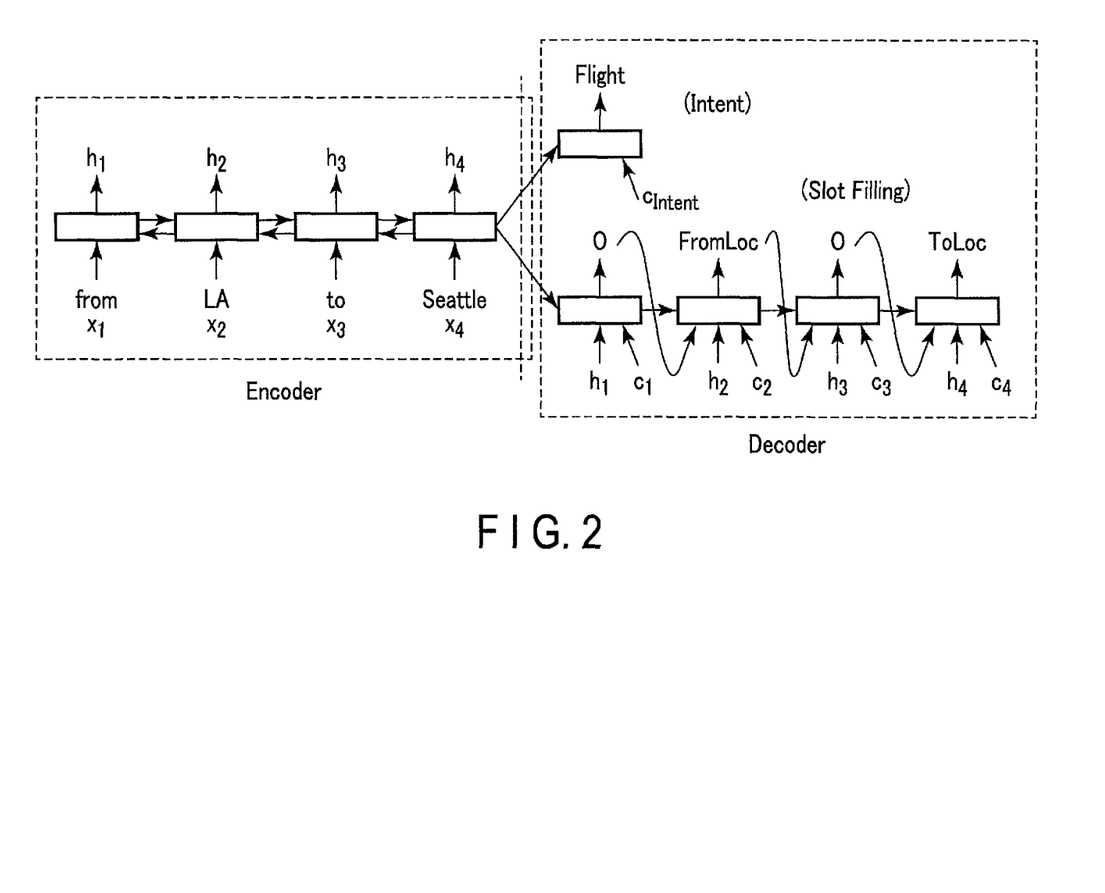
FIG. 2 is an explanatory illustration of the intent/search criterion estimator shown in FIG. 1.

Related Art 1 specifically describes a method of estimating speech tags and slots applicable to flight searches on travel sites. A schematic view of this is shown in FIG. 2. In the example, an encoder for a bidirectional Long-Short Time Memory (LSTM), that is a kind of RNN, encodes the word string "from LA to Seattle" included in a text input. A decoder for a unidirectional LSTM then decodes the encoded word string and estimated the speech tag "Flight" as well as the slots [FromLoc (departure airport)=LA] and [ToLoc (arrival airport)=Seattle]. The result of the estimation is then generally expressed as probabilities, i.e. the probability of [FromLoc=LA] being 80%, and the probability of [ToLoc=Seattle] being 60%.

The search criterion may be expressed similar to, for example, a slot as [criterion (attribute)=value]; however, expressions for search criteria can be dependent on the schema of the search DB 107. A search criterion may be estimated similar to a slot by using keyword matching or a statistical approach.

The intent/search criterion estimator 103 may perform processes of search criterion handoff, such as maintaining a criterion estimated in the past even when the current text input fails to mention the criterion, or deleting a criterion estimated in the past when the current text input means deleting the criterion. The process of search criterion handoff may, for example, be defined as a rule. The process of search criterion handoff may also be estimated by using the earlier mentioned criterion values and statistical approaches.

The intent/search criterion estimator 103 may, although not shown in FIG. 1, receive a text input and a satisfaction estimated by the satisfaction estimator 102, and then estimate the intent/search criterion based thereon. The intent/search criterion estimator 103 may specifically as well consider the satisfaction for determining probability of the speech tag, slot or search criterion. The intent/search criterion estimator 103 may, for example, determine that the probability has increased if the text input remains unchanged although the satisfaction increased. This way, the intent/search criterion can be reflected more easily in the behavior of the dialogue system 100.

The dialogue state estimator 104 receives, for example, for each speech uttered by the user 10, a satisfaction from the satisfaction estimator 102 as well as an intent/search criterion from the intent/search criterion estimator 103. The dialogue state estimator 104 then estimates the latest dialogue state based on the dialogue state that was estimated based on the satisfaction and the intent/search criterion received so far, and on the newly received satisfaction and intent/search criterion.

As an example, the dialogue state estimator 104 may store the initial received satisfaction and intent/search criterion as the initial dialogue state. The dialogue state estimator 104 may then estimate the latest dialogue state by updating, based on the newly received satisfaction and intent/search criterion, the last stored dialogue state, i.e. the last estimated dialogue state.

The dialogue state may include, for example, the intent, the search criterion, and the satisfaction of the user 10. The dialogue state estimator 104 may update the dialogue state by revising the probability of the satisfaction, intent and search criterion of the user 10 included in the last stored dialogue state based on a newly received probability of the satisfaction, intent and search criterion. The dialogue state estimator 104 then transmits the updated dialogue state to the behavior determiner 105, and transmits the search criterion that is included therein to the searcher 106.

The searcher 106 receives a search criterion from the dialogue state estimator 104 and then searches the search DB 107 based on the search criterion. The searcher 106 then transmits the result of the search to the behavior determiner 105.

The search DB 107 has multiple search objects stored in advance. These search objects are manifold, for example, information regarding restaurant stores, information regarding hotel room vacancies, information regarding flight vacancies, information regarding products such as bags etc. Both the type of DB used for the search DB 107 and the search method for the searcher 106 are not limited in any specific way, meaning they are viable in different ways. The search DB 107 does not have to be built into the dialogue system 100; it may be an external database accessible from a system other than the dialogue system 100.

The behavior determiner 105 receives the dialogue state, i.e. intent, search criterion and satisfaction, from the dialogue state estimator 104, as well as a search result from the searcher 106, and then determines a behavior of the dialogue system 100 based on the dialogue state and the search result. The behavior determiner 105 then transmits the behavior to the response generator 108.

A behavior may be expressed by information such as a tag and a slot which conceptually indicate the action to be taken by the dialogue system 100. As behavior specifically, the behavior determiner 105 may determine, for example, "Request (product) (confirming preferred product with user 10)" and "Offer (store name=store A) (presenting store A as the store the user 10 prefers)".

The behavior determiner 105 may determine a behavior, for example, by assigning the input data that is based on the dialogue state and the search result to a learnt statistical model (e.g. a learnt neural network, also referred to as a policy model). The learnt statistical model may be generated by, for example, reinforcement learning. The details on the performances of the behavior determiner 105 and the machine learning will be explained further below.

The response generator 108 receives a behavior from the behavior determiner 105 and then generates, based on the behavior, a text response to be presented to the user 10. The response generator 108 then transmits this text response to the text-to-speech synthesizer 109.

The response generator 108 can generate a text response through various techniques. The response generator 108 may, for example, generate a text response by consulting predetermined text responses for each behavior and reading out the text response that corresponds to the received behavior. The response generator 108 may also generate a text response by utilizing prepared text responses having a blank, and then filling out that blank with the slot value (word) included in the dialogue state. The response generator 108 may also generate a text response by utilizing a text response-generating model created by machine learning that uses text responses gathered in large quantity in advance which correspond to the behavior.

The response generator 108 may generate information for presenting the text response and search result, and then present the information to the user 10 using an output device such as a display not shown in the drawings.

The text-to-speech synthesizer 109 receives the text response from the response generator 108 and performs speech-synthesizing, namely a Text-to-Speech (TTS) process, thereunto, in order to generate a speech response. The text-to-speech synthesizer 109 then transmits the speech response to an output device not shown in the drawings, such as a speaker. The speech response is then presented to the user 10 through the output device.

If the text response does not have to be presented acoustically, the text-to-speech synthesizer 109 may be omitted. In that case, the text response may be visually presented by an output device such as a display not shown in the drawings.

Next, examples of the performances of the satisfaction estimator 102 will be described in detail. The satisfaction estimator 102 may estimate a satisfaction on the earlier mentioned rule base, or using a learnt statistical model. Below, the latter will be described in detail.

Figure 3:
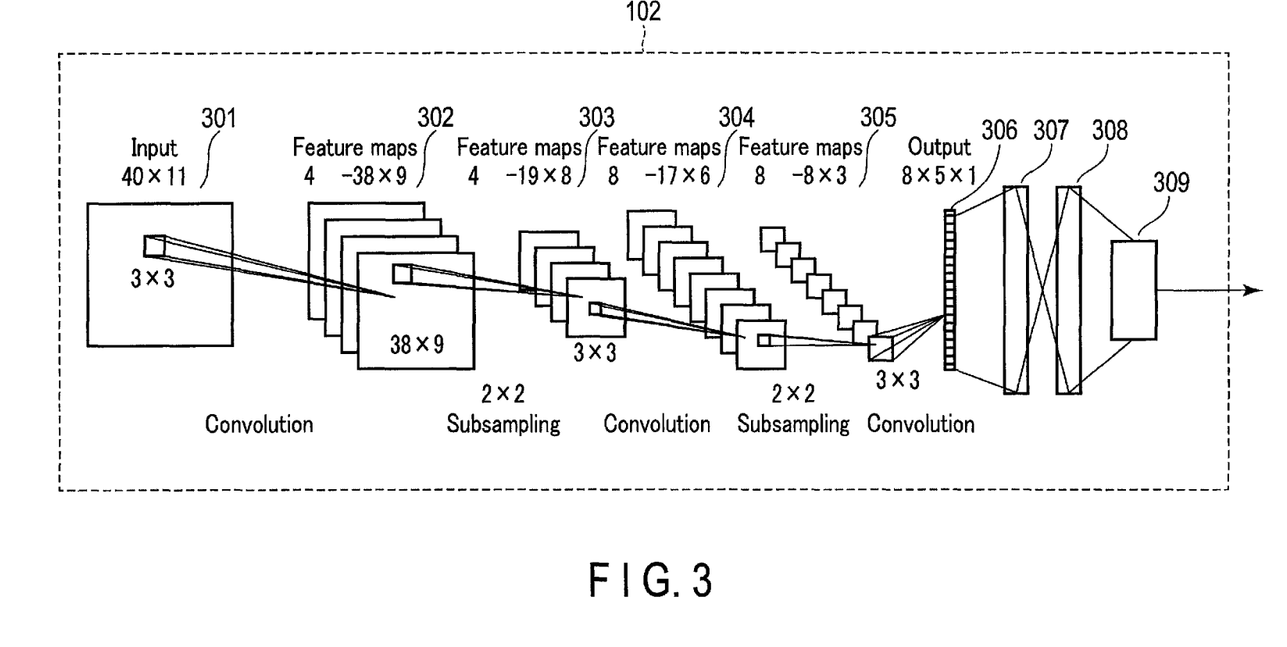
FIG. 3 is an illustration of a convolutional neural network included in the satisfaction estimator shown in FIG. 1.

The satisfaction estimator 102 can comprise a Convolutional Neural Network (CNN) shown in FIG. 3. The CNN comprises an input layer 301, a convolution layer 302, a pooling layer 303, a convolution layer 304, a pooling layer 305, a convolution layer 306, a fully-connected layer 307, a fully-connected layer 308, and a soft max layer 309.

The input layer 301 creates a 40-dimensional vector by using the Fourier transformation to convert an electric signal as speech input at frame units of 30 ms, breaking down the result of the Fourier transformation into 40 frequency bands, and performing averaging within each frequency band. The input layer 301 then arranges two-dimensionally the vector of a total of 11 frames, i.e. the current frame plus five preceding and five succeeding frames, to create a matrix of 40×11.

The convolution layer 302 performs convolutional calculation, applying 2D filters of 3×3 onto the matrix created by the input layer 301 (feature map), and then applies a non-linear activating function to each of the results of the calculation. Since the convolution layer 302 uses four kinds of 2D filters, four matrixes of 38×9 are created.

The pooling layer 303 performs 2×2 averaging of the matrixes created by the convolution layer 302, i.e. calculates an average of the 2×2 members derived from the created matrixes, and then substitutes the 2×2 members for that average. This way, the pooling layer 303 creates four matrixes of 19×8.

The convolution layer 304 performs convolutional calculation applying 2D filters of 3×3 to the matrixes created by the pooling layer 303, and then applies a non-linear activating function to each of the results of the calculation. Since the convolution layer 304 uses eight kinds of 2D filters, eight matrixes of 17×6 are created. The pooling layer 305 performs 2×2 averaging unto the matrixes created by the convolution layer 304. In this way, the pooling layer 305 creates eight matrixes of 8×3.

The convolution layer 306 performs convolutional calculation applying 2D filters of 3×3 to the matrixes created by the pooling layer 305, and then applies a non-linear activating function to each of the results of the calculation. The convolution layer 306 then creates a matrix of 5×1 for each of the eight created matrixes, i.e. a 5-dimensional vector, combines the eight vectors and then transmits the result as a 40-dimensional vector to the fully-connected layer 307.

The fully-connected layer 307 performs, similar to a common neural network, affine transformation (matrix calculation) unto the received vector and then transmits the result, after applying an activating function, to the fully-connected layer 308. The fully-connected layer 308 then similarly performs affine transformation unto the received vector and transmits the result, after applying an activating function, to the soft max layer 309.

The soft max layer 309 applies a soft max function to the vector received from the fully-connected layer 308 and calculates a posterior probability of each satisfaction rating. Note that the soft max layer 309 calculates a posterior probability for each frame of the speech input, i.e. every 30 ms.

The satisfaction estimator 102 may estimate a satisfaction of the user 10 for a speech by, for example, averaging a posterior probability of each satisfaction rating across all frames within the speech. An example of an estimation result is shown in FIG. 4. A satisfaction does not necessarily have to be expressed as a probability distribution. The satisfaction estimator 102 may express as an estimated satisfaction, for example, an expected value estimated from the probability distribution calculated for the speech, i.e. the sum of the products of the instances of rating and the posterior probabilities of the rating across the instances of rating.

Weighting matrixes and bias vectors used for filter calculations or affine transformations in the CNN shown in FIG. 3 are also referred to as model parameters. Model parameters are determined statistically through machine learning. Machine learning uses large amounts of learn-specific speech input and satisfaction label data allocated to the learn-specific speech input. Label data can, for example, be created by comprehensive evaluation through humans using non-verbal information included in the learn-specific speech input such as speech tone and emotion as hints. Label data may be, as earlier mentioned, 5-step-, 2-step-, 3-step-scale systems, or scale systems within any numerical range. Label data is also referred to as training data. By this machine learning, the model parameters are repeatedly optimized in the manner of back propagation from the transmitting to the receiving end to minimize the cross-entropy calculated based on the satisfaction estimated by the posterior probability from the CNN and the satisfaction indicated in the label data.

Next, examples of the performances of the behavior determiner 105 will be described in detail. The behavior determiner 105 may, as mentioned earlier, determine behavior using a rule base; however, this leads to the problem of increased developing costs and longer development times. Besides, when determining behavior by using a learnt statistical model (policy model), the behavior may be deemed statistically optimal, but if the behavior is determined by using a rule base, explaining the optimal behavior objectively will be difficult. In this instance, the behavior determiner 105 will therefore determine the behavior using the policy model; however, it would have been fine if the behavior had been determined by the behavior determiner 105 using the rule base.

The model parameters for the policy model to be used by the behavior determiner 105 may, for example, be determined by reinforcement learning as will be described below. Policy models may, for example, be deep neural network-based models such as a Gaussian process model, a Deep Q-Net (DQN)-based model or any other such model. To optimize the model parameters, it is possible to use the Actor critic method or State Action Reward State Action (SARSA) method.

According to the aforementioned reinforcement learning, either a positive or a negative reward is given, depending on whether or not the dialogue is unfolding as desired by the user 10. The behavior determination method is learned by trial-and-error from the viewpoint of how behavior towards the learn-specific dialogue state and the search results are to be determined to maximize the rewards achievable by the end of the dialogue. The policy models are created by determining the optimum model parameters through learning.

Figure 7:
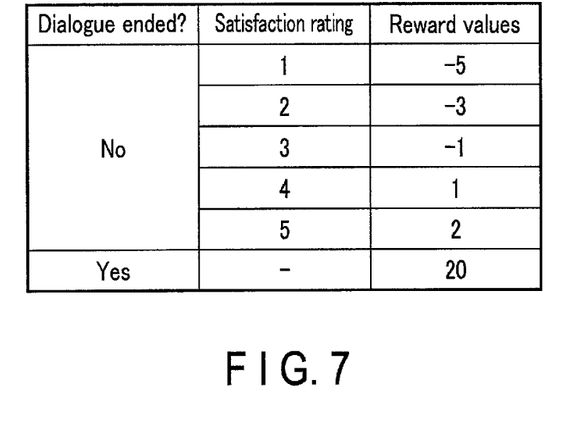
FIG. 7 is a table showing reward values used in the machine learning process for the purpose of creating a policy model to be used by the behavior determiner shown in FIG. 1

A reward may be given, for example, for each speech during the dialogue, as well as when the dialogue has finished. Specifically, when the dialogue has finished, a large positive reward in form of an absolute value may be given, and for each speech during the dialogue, a minor negative reward as an absolute value may be given. By this reward system, a method for determining a behavior of ending the dialogue after a minor interaction is learned as policy model. Alternatively a reward corresponding to the satisfaction of each speech may be given during the dialogue, as shown in FIG. 7. In the example shown in FIG. 7, rewards of "−5", "−3", "−1", "1", "2" are set in ascending order for a 5-step-satisfaction scale. According to this reward system, a method as policy model is learned for determining a behavior of ending the dialogue after a minor interaction with a satisfaction of the user 10 that is average or low. It is also possible to not give a reward during the dialogue and to give a reward that corresponds to the satisfaction when the dialogue has finished.

By using the so-created policy model, the behavior determiner 105 can determine a behavior which maximizes the reward that is statistically expected to be achievable by the end of the dialogue for the entered dialogue state and search result. The behavior determiner 105 determines a behavior giving consideration to the satisfaction included in the dialogue state. Depending on the learning of the policy model, the behavior determiner 105 can therefore select a behavior that is concerned with the emotion of the user whose satisfaction is decreasing as the user is growing impatient with the responses from the dialogue system 100. The behavior may be to avoid repeating the same question over and over, for example, or a simple response that says "We are very sorry" that alleviates the frustration of the user 10.

Figure 6:
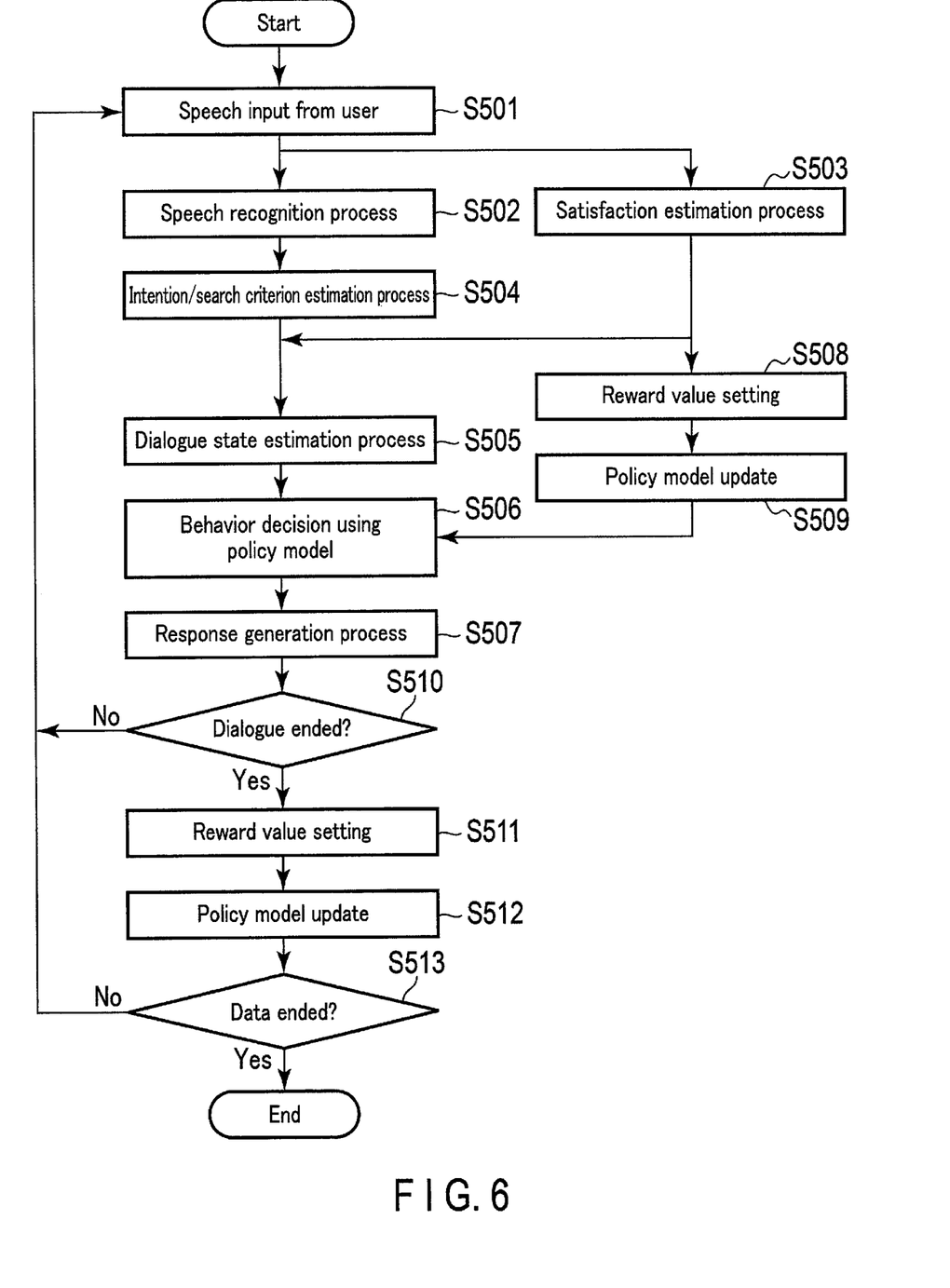
FIG. 6 is a flowchart showing machine learning for the purpose of creating a policy model to be used by the behavior determiner shown in FIG. 1.

The policy model used by the behavior determiner 105 may specifically be created by the machine learning shown in FIG. 6. In the following descriptions, a dialogue system 100 shown in FIG. 1 was selected for performing the machine learning shown in FIG. 6; but it is also possible to have the machine learning be performed by another device such as a computer, and to set the policy model in the dialogue system 100.

The procedure of the machine learning shown in FIG. 6 starts at step S501. In step S501, the speech recognizer 101 and the satisfaction estimator 102 each receive a learn-specific speech input. The learn-specific speech input may be drawn as learning data from large amounts of previously gathered case examples of dialogues between the dialogue system 100 and the user, and may be obtained in real-time by having the dialogue system 100 hold dialogue with the user before the official start of operation.

The speech recognizer 101 performs speech recognition unto the speech input received in step S501 and obtains a recognized text (step S502). The satisfaction estimator 102 then estimates, based on the speech input received in step S501, the satisfaction of the user that uttered the speech (step S503).

The intent/search criterion estimator 103 then receives the text recognized in step S502, and estimates, based thereon, the intent and/or the search criterion of the user (step S504).

The dialogue state estimator 104 estimates the latest dialogue state based on the satisfaction estimated in step S503, the intent/search criterion estimated in step S504, and the dialogue state estimated during the previous performance of step S505 (however, if the ongoing dialogue is different from that when previously performed, the dialogue state may be reset) (step S505).

On the other hand, at a policy model learner not shown in the drawings, a reward corresponding to a satisfaction estimated in step S503 is set (step S508). Here, the reward system may be the one shown in FIG. 7. In addition, the policy learner updates (the model parameters of the) policy model based on the rewards set in step S508 (step S509). If rewards are not given for each speech, the steps S508 and step S509 can be omitted.

The behavior determiner 105 determines the behavior of the dialogue system 100 based on the dialogue state estimated in step S505 by using the policy model updated in step S509 (step S506).

The response generator 108 generates, based on the behavior determined in step S506, a system response such as a text response (step S507). If the dialogue has ended after step S507 is finished, the procedure continues to step S511; otherwise, the procedure returns to step S501 in order to continue the dialogue (step S510).

In step S511, a policy model learner not shown in the drawings sets a reward that corresponds to the dialogue's ending (step S511). Here, the reward system may be the one shown in FIG. 7. The policy learner also updates the policy models based on the reward set in step S511 (step S512). After step S512 is finished and in the case where, for example, unprocessed learning data remains, or a different dialogue with the user has been initiated, the procedure continues to step S501 (step S513). Otherwise, if learning is not continued, the machine learning shown in FIG. 6 is ended.

Figure 5:
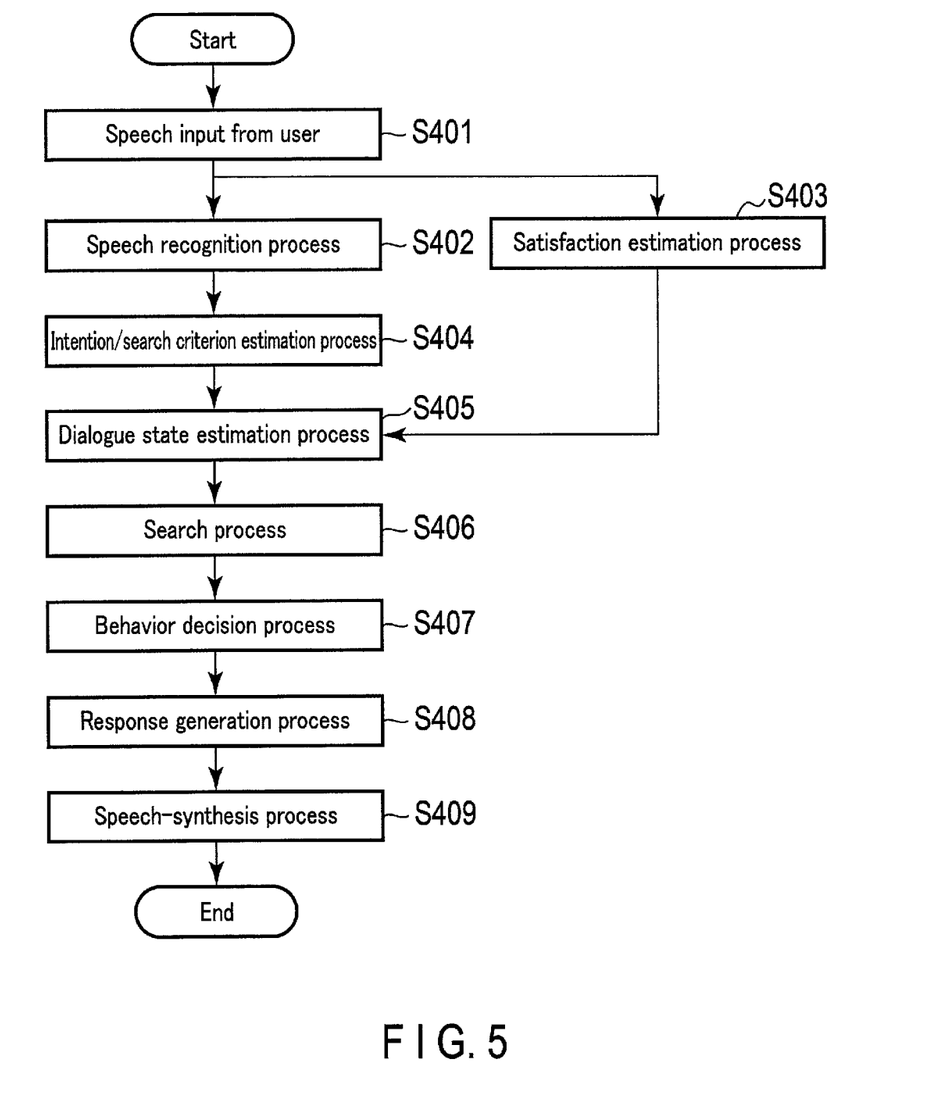
FIG. 5 is a flowchart showing the performances by the dialogue system of FIG. 1.

Next, the performances of the dialogue system 100 will be described in detail with reference to FIG. 5. FIG. 5 shows the performances for presenting a single response towards a single user input by the system, executed by the dialogue system 100 for each speech uttered by the user 10. The performances shown in FIG. 5 may therefore be executed repeatedly during an ongoing dialogue.

The procedure of the performances shown in FIG. 5 starts at step S401. In step S401, the speech recognizer 101 and the satisfaction estimator 102 each receive the speech inputs by the user 10.

The speech recognizer 101 performs speech recognition unto the speech input received in step S401 to obtain a recognized text (step S402). The satisfaction estimator 102 then estimates the satisfaction of the user 10 based on the speech input received in step S401 (step S403).

The intent/search criterion estimator 103 receives the text recognized in step S402, and then estimates, based thereon, the intent of the user 10 and/or search criterion (step S404).

The dialogue state estimator 104 estimates the latest dialogue state based on the satisfaction estimated in step S403, the intent/search criterion estimated in step S404, and the dialogue state estimated during the previous performance of step S405 (however, if the ongoing dialogue is different from that when previously performed, the dialogue state may be reset) (step S405).

The searcher 106 searches the search DB 107 based on the search criterion included in the dialogue state estimated in step S405 (step S406). The behavior determiner 105 determines, using a learnt policy model, the behavior of the dialogue system 100 based on the dialogue state estimated in step S405 and the search results of step S406 (step S407).

The response generator 108 generates a system response such as, for example, a text response based on the behavior determined in step S407 (step S408). The text-to-speech synthesizer 109 receives the text response generated in step S408 and performs thereunto a speech-synthesis process to generate a speech response (step S409). An output device not shown in the drawings then presents the speech response to the user 10. This is the last of the performances shown in FIG. 5.

As described above, a dialogue system according to the first embodiment estimates a satisfaction of the user based on a speech input by the user, and then estimates a dialogue state based on the satisfaction and the user input (e.g. the aforementioned text recognized from the speech input). The dialogue system also determines a behavior based on the dialogue state. It is therefore possible by this dialogue system to adopt a behavior that is concerned with the emotion of the user whose satisfaction is decreasing as the user is growing impatient with the responses from the dialogue system. The behavior may be, for example, to avoid repeating the same questions over and over, or a simple "We are very sorry", which alleviates the frustration of the user.

Second Embodiment

Figure 8:
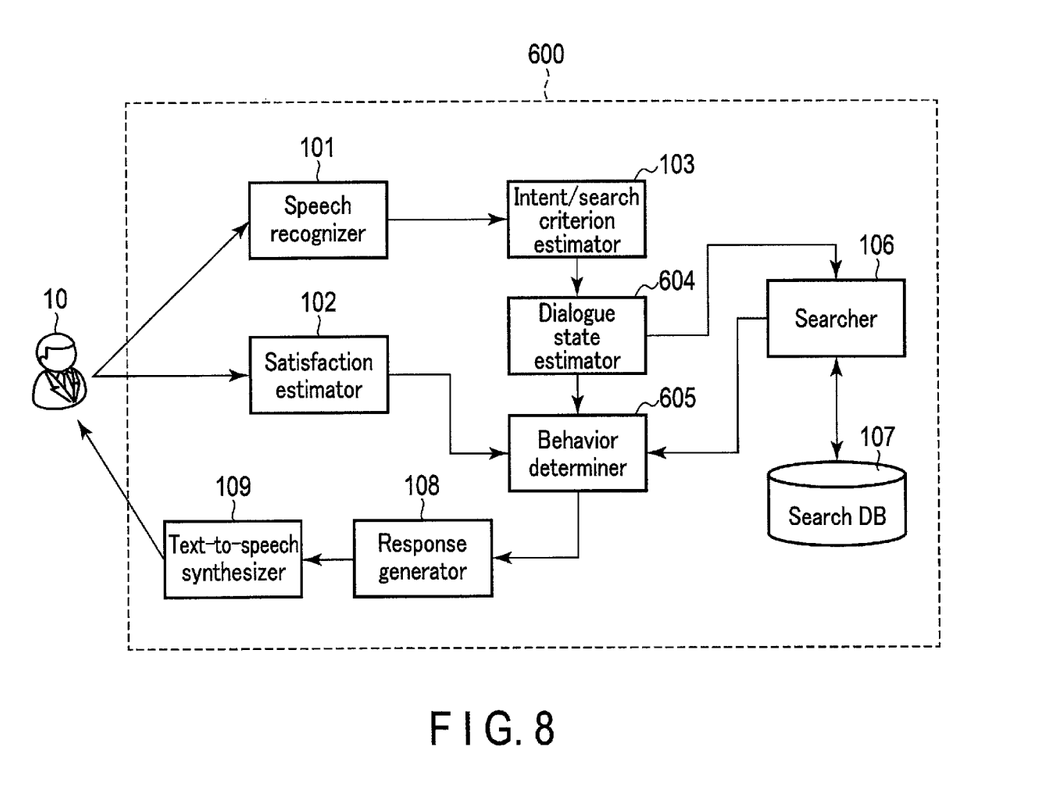
FIG. 8 is a block diagram showing a dialogue system according to a second embodiment.

A dialogue system 600 according to a second embodiment as shown in FIG. 8 comprises a speech recognizer 101, a satisfaction estimator 102, an intent/search criterion estimator 103, a dialogue state estimator 604, a behavior determiner 605, a searcher 106, a search DB 107, a response generator 108, and a text-to-speech synthesizer 109.

What distinguishes the dialogue state estimator 604 from the earlier mentioned dialogue state estimator 104 is the circumstance that the prior estimator estimates a dialogue state without giving consideration to a satisfaction for each speech uttered by the user 10 estimated by the satisfaction estimator 102. In other words, the dialogue state estimator 604 receives, for example for each speech uttered by the user 10, an intent/search criterion from the intent/search criterion estimator 103. The dialogue state estimator 604 then estimates the latest dialogue state based on the dialogue state that was estimated based on the intent/search criterion received so far and on the newly received intent/search criterion.

For example, when first receiving the intent/search criterion, the dialogue state estimator 604 may store the same as an initial dialogue state. From there, the dialogue state estimator 604 may estimate the latest dialogue state by updating the last stored dialogue state, i.e. the last estimated dialogue state, based on the newly received intent/search criterion.

The dialogue state may comprise, for example, intent and search criterion of the user 10. The dialogue state estimator 604 may update the dialogue state by revising the probability of the intent and search criterion of the user 10 included in the last stored dialogue state based on the probability of the newly received intent and search criterion. The dialogue state estimator 604 then transmits the updated dialogue state to the behavior determiner 605 and transmits the search criterion included therein to the searcher 106.

The behavior determiner 605 determines a behavior of the dialogue system 600 based on a satisfaction of speech uttered by the user 10 estimated by the satisfaction estimator 102, a dialogue state estimated by the dialogue state estimator 604 (this does not include a satisfaction), and a search result from the searcher 106.

The behavior determiner 105 may determine, for example, a behavior by applying input data which is based on a satisfaction, a dialogue state and a search result to a policy model (e.g. to a statistical model such as a learnt neural network). The policy model may be created, for example, by reinforcement learning explained with reference to FIG. 6, or by similar reinforcement learning.

As described above, a dialogue system according to the second embodiment estimates a satisfaction of the user based on a speech input from the user, and then estimates a dialogue state based on the user's input (e.g. a text recognized from the speech input). The dialogue system also determines a behavior based on a satisfaction and a dialogue state. It is therefore possible by this dialogue system to adopt a behavior which is concerned with the emotion of the user, similar to the dialogue system according to the first embodiment.

Third Embodiment

Figure 9:
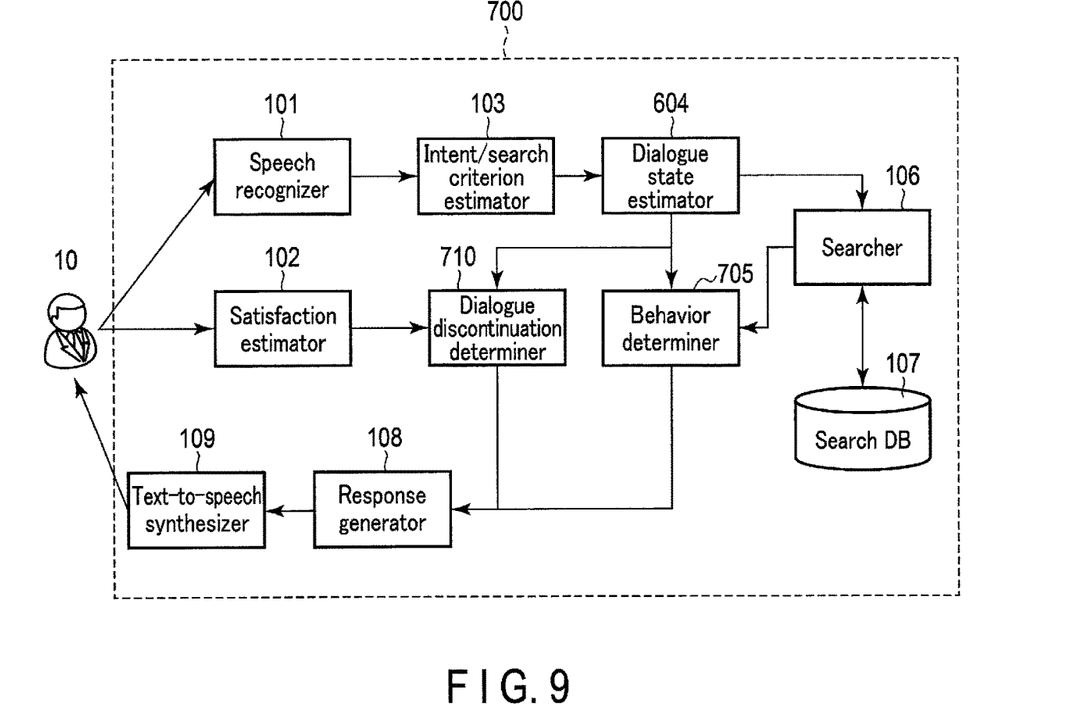
FIG. 9 is a block diagram showing a dialogue system according to a third embodiment.

A dialogue system 700 according to a third embodiment as shown in FIG. 9 comprises a speech recognizer 101, a satisfaction estimator 102, an intent/search criterion estimator 103, a dialogue state estimator 604, an behavior determiner 705, a searcher 106, a search DB 107, a response generator 108, a text-to-speech synthesizer 109, and a dialogue discontinuation determiner 710.

The behavior determiner 705 determines a behavior of the dialogue system 700 based on a dialogue state estimated by the dialogue state estimator 604 (this does not include a satisfaction) and a search result from the searcher 106.

The behavior determiner 705 may determine a behavior by, for example, applying input data that is based on a satisfaction, a dialogue state and a search result to a policy model (e.g. a statistical model such as a learnt neural network). The policy model may, for example, be created by reinforcement learning explained with reference to FIG. 6, or by similar reinforcement learning.

The behavior determiner 705 may be replaced by the earlier mentioned behavior determiner 605. Moreover, a combination of the dialogue state estimator 604 and the behavior determiner 705 may be replaced by a combination of the earlier mentioned dialogue state estimator 104 and the behavior determiner 105.

The dialogue discontinuation determiner 710 receives, for example, a satisfaction from the satisfaction estimator 102 for each speech uttered by the user 10. The dialogue discontinuation determiner 710 then determines, based on the received satisfaction, whether or not to discontinue the dialogue between the user 10 and the dialogue system 700.

The dialogue discontinuation determiner 710 may specifically determine whether or not to discontinue the dialogue in cases where the instantaneous or statistical value of the satisfaction, for example, the average of satisfactions of the user 10 with the speeches of the past several times, falls to or below a threshold. The dialogue discontinuation determiner 710 may then determine whether or not to discontinue the dialogue based on the satisfaction and the estimated probability of the dialogue state, e.g. intent and search criterion, estimated by the dialogue state estimator 604. The dialogue discontinuation determiner 710 may also determine whether or not to discontinue the dialogue if, for example, the satisfaction falls to or below a threshold a1 or the estimated probability of the dialogue state falls to or below a threshold b1, or if the satisfaction falls to or below a threshold a2 and the estimated probability of the dialogue state falls to or below a threshold b2.

If the dialogue discontinuation determiner 710 determines that the dialogue should be ended, the dialogue discontinuation determiner 710 will notify the response generator 108 thereof. The dialogue discontinuation determiner 710 may then generate a text response for the response generator 108, such as "We are very sorry, but our automatic system cannot support you. We will connect you to an operator". The dialogue discontinuation determiner 710 may also notify discontinuation of the dialogue to a higher system and hand over the dialogue to an operator.

As described above, a dialogue system according to the third embodiment estimates the user's satisfaction based on the user's speech input. This dialogue system also determines whether or not to discontinue the dialogue based on the satisfaction. It is therefore possible to avoid the user from becoming terribly dissatisfied with the dialogue system when it becomes too difficult to continue the dialogue with the dialogue system, for example, when the user is about to become excessively dissatisfied or already is excessively dissatisfied, by automatically discontinuing the dialogue and, for example, handing over the dialogue to an operator.

The dialogue systems 100, 600 and 700 according to the earlier mentioned first, second and third embodiments are also viable by the use of, for example, an all-purpose computer device functioning as basic hardware. Specifically, all or part of the components that are the speech recognizer 101, the satisfaction estimator 102, the intent/search criterion estimator 103, the dialogue state estimator 104 or 604, the behavior determiner 105, 605 or 705, the searcher 106, the search DB 107, the response generator 108, the text-to-speech synthesizer 109, and the dialogue discontinuation determiner 710 may be viable by causing a control device such as a computer-built-in processor to run a program.

Figure 10:
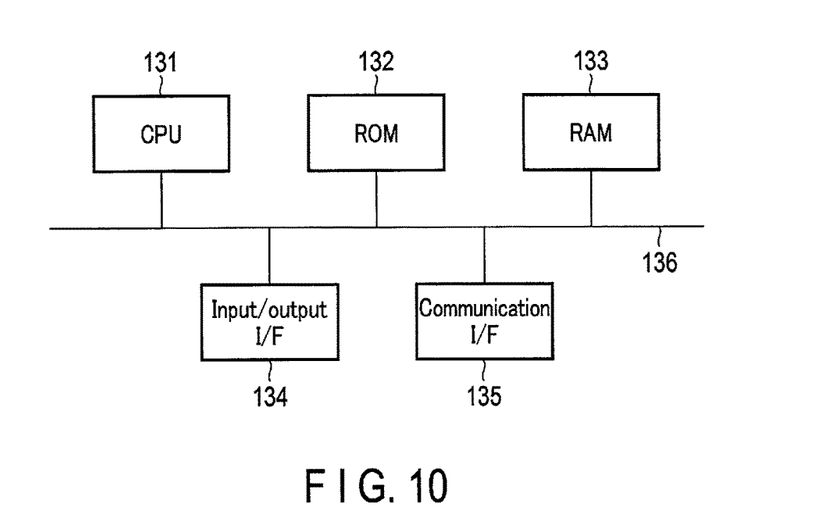
FIG. 10 is a block diagram showing a hardware configuration of each of the dialogue systems according to the first to third embodiments.

The computer device shown in FIG. 10 can include a control device such as a CPU 131, a storage device such as a ROM 132 and a RAM 133, an input/output Interface (I/F) 134 connected to a device such as a microphone, a (manipulation) input device or a display, a network-connected communication I/F 135 for communication, and a bus 136 for connecting all of the hardware.

The program that is run by the control device may be pre-installed to the computer device or may be obtained via a storage medium such as a CD-ROM or via network, and then be installed. Each functioning unit can also utilize, if appropriate, a memory or hard disc that is either built-in or external, or a storage medium such as a CD-R, a CD-RW, a DVD-RAM or a DVD-R.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A dialogue system comprising:
a convolutional neural network including at least an input layer; and
circuitry configured to:
estimate a satisfaction of a user based on a speech input from the user by applying an electrical signal into the input layer, wherein the input layer creates a multi-dimensional vector by using the Fourier transformation to convert the electrical signal as the speech input;
estimate a dialogue state with the user based on the speech input from the user and the estimated satisfaction of the user;
update the estimated dialogue state based on a previous dialogue state stored in the circuitry; and
determine a behavior towards the user based on the updated dialogue state.

2. The dialogue system according to claim 1, wherein the circuitry is further configured to estimate the satisfaction of the user by applying input data that is based on the speech input to a learnt statistical model that is created by performing supervised learning using learn-specific speech input with a label indicative of a satisfaction.

3. The dialogue system according to claim 1, wherein the satisfaction is expressed as a probability distribution.

4. The dialogue system according to claim 1, wherein the circuitry is further configured to determine the behavior towards the user by applying input data that is based on the dialogue state to a learnt statistical model that is created by performing reinforcement learning.

5. The dialogue system according to claim 4, wherein a reward used in the reinforcement learning is set according to a satisfaction of a user who uttered a learn-specific speech input, estimated based on the learn-specific speech input.

6. A dialogue system comprising:
a convolutional neural network including at least an input layer; and
circuitry configured to:
estimate a satisfaction of a user based on a speech input from the user by applying an electrical signal into the input layer, wherein the input layer creates a multi-dimensional vector by using the Fourier transformation to convert the electrical signal as the speech input;
estimate a dialogue state with the user based on an input from the user;
update the estimated dialogue state based on a previous dialogue state stored in the circuitry; and
determine a behavior towards the user based on the estimated satisfaction and the updated dialogue state.

7. A dialogue system comprising:
a convolutional neural network including at least an input layer; and
circuitry configured to:
estimate a satisfaction of a user based on a speech input from the user by applying an electrical signal into the input layer, wherein the input layer creates a multi-dimensional vector by using the Fourier transformation to convert the electrical signal as the speech input;
estimate a dialogue state of a dialogue with the user based on at least an input from the user;
update the estimated dialogue state based on a previous dialogue state stored in the circuitry;
determine a behavior towards the user based on the updated dialogue state; and
determine whether or not to discontinue the dialogue with the user based on at least the estimated satisfaction.

8. The dialogue system according to claim 7, wherein the circuitry is further configured to determine whether or not to discontinue the dialogue with the user based on the dialogue state and the estimated satisfaction.

9. The dialogue system according to claim 7, wherein the circuitry is further configured to automatically hand over the dialogue with the user to an operator when the dialogue with the user is determined to be discontinued.

* * * * *